United States Patent
Wardman et al.

(10) Patent No.: US 9,866,582 B2
(45) Date of Patent: Jan. 9, 2018

(54) DETECTION OF SCRIPTED ACTIVITY

(71) Applicant: PAYPAL, INC., San Jose, CA (US)

(72) Inventors: Bradley Wardman, Phoenix, AZ (US);
Ryan A. Carrico, Scottsdale, AZ (US);
Nathan Robert Pratt, Scottsdale, AZ (US)

(73) Assignee: PayPal, Inc., San Jose, CA (US)

(*) Notice: Subject to any disclaimer, the term of this patent is extended or adjusted under 35 U.S.C. 154(b) by 103 days.

(21) Appl. No.: 14/320,491

(22) Filed: Jun. 30, 2014

(65) Prior Publication Data
US 2015/0381652 A1 Dec. 31, 2015

(51) Int. Cl.
H04L 29/06 (2006.01)
G06F 21/51 (2013.01)
G06F 21/56 (2013.01)
H04L 9/32 (2006.01)

(52) U.S. Cl.
CPC .......... H04L 63/1441 (2013.01); G06F 21/51 (2013.01); G06F 21/566 (2013.01); H04L 9/3271 (2013.01); H04L 63/1416 (2013.01)

(58) Field of Classification Search
CPC ............. H04L 63/1416; H04L 63/1408; H04L 63/1441; H04L 63/1458; G06F 21/552
See application file for complete search history.

(56) References Cited

U.S. PATENT DOCUMENTS

| | | | |
|---|---|---|---|
| 7,343,626 B1 | 3/2008 | Gallagher | |
| 7,636,945 B2 | 12/2009 | Chandnani et al. | |
| 8,233,500 B2 * | 7/2012 | Beser | H04L 12/2801 370/230 |
| 8,244,799 B1 * | 8/2012 | Salusky | H04L 63/126 709/201 |
| 8,448,241 B1 * | 5/2013 | Kadakia | G06F 11/3688 726/22 |
| 8,578,482 B1 * | 11/2013 | Yang | G06F 21/51 726/22 |
| 8,694,608 B2 * | 4/2014 | Salusky | H04L 63/126 709/203 |
| 8,839,428 B1 * | 9/2014 | Oliver | G06F 21/52 709/224 |
| 8,935,773 B2 * | 1/2015 | Stavrou | G06F 21/566 726/12 |
| 9,065,849 B1 * | 6/2015 | Rivera | H04L 63/1433 |
| 9,338,012 B1 * | 5/2016 | Naik | H04L 9/3247 |
| 2002/0120853 A1 | 8/2002 | Tyree | |

(Continued)

OTHER PUBLICATIONS

United States Patent and Trademark Office, International Search Report and Written Opinion for PCT/US15/27595, dated Jul. 28, 2015, 9 pages.

*Primary Examiner* — Harunur Rashid
*Assistant Examiner* — Sanchit Sarker
(74) *Attorney, Agent, or Firm* — Haynes and Boone, LLP

(57) ABSTRACT

Methods, systems, and computer program products for online content referral are provided. A computer-implemented method may include receiving a request from an application, issuing a challenge to the application to determine a capability of the application, analyzing a result of the challenge to associate the application with an application type, determining whether the activity performed by the application is scripted, and classifying the activity as automated or semi-automated when it is determined that the activity is scripted.

19 Claims, 4 Drawing Sheets

(56) References Cited

U.S. PATENT DOCUMENTS

| | | | |
|---|---|---|---|
| 2003/0159063 A1* | 8/2003 | Apfelbaum | G06F 21/577 726/25 |
| 2005/0223239 A1* | 10/2005 | Dotan | G06F 21/52 713/188 |
| 2006/0253581 A1 | 11/2006 | Dixon et al. | |
| 2010/0132038 A1* | 5/2010 | Zaitsev | G06F 21/552 726/22 |
| 2010/0332667 A1* | 12/2010 | Menchaca | G06F 3/04847 709/228 |
| 2011/0239294 A1* | 9/2011 | Kim | G06F 21/566 726/22 |
| 2011/0280160 A1 | 11/2011 | Yang | |
| 2012/0030731 A1* | 2/2012 | Bhargava | G06F 21/54 726/3 |
| 2012/0072968 A1* | 3/2012 | Wysopal | G06F 11/3612 726/1 |
| 2012/0159629 A1* | 6/2012 | Lee | G06F 21/566 726/24 |
| 2012/0266244 A1* | 10/2012 | Green | G06F 21/566 726/24 |
| 2013/0111584 A1* | 5/2013 | Coppock | H04L 63/145 726/22 |
| 2013/0145463 A1* | 6/2013 | Ghosh | G06F 21/56 726/22 |
| 2013/0254880 A1* | 9/2013 | Alperovitch | G06F 21/51 726/22 |
| 2013/0290709 A1* | 10/2013 | Muppidi | H04W 12/08 713/168 |
| 2013/0298192 A1 | 11/2013 | Kumar et al. | |
| 2014/0130161 A1* | 5/2014 | Golovanov | G06F 21/564 726/23 |
| 2014/0164178 A1* | 6/2014 | Adjaoute | G06Q 30/0609 705/26.35 |
| 2014/0180666 A1* | 6/2014 | Muttik | G06F 9/455 703/27 |
| 2014/0189779 A1* | 7/2014 | Baghdasaryan | H04L 63/08 726/1 |
| 2015/0033331 A1* | 1/2015 | Stern | H04L 63/1425 726/22 |
| 2015/0067853 A1* | 3/2015 | Amrutkar | H04L 63/14 726/23 |
| 2015/0128236 A1* | 5/2015 | Moscicki | H04L 63/0876 726/7 |
| 2015/0180885 A1* | 6/2015 | Edery | G06F 21/51 726/1 |
| 2015/0220735 A1* | 8/2015 | Paithane | G06F 21/566 726/23 |
| 2015/0264059 A1* | 9/2015 | Stavrou | G06F 21/566 726/23 |

\* cited by examiner

DETECTION OF SCRIPTED ACTIVITY

TECHNICAL FIELD

The present invention generally relates to computer system security and, more particularly, to the detection and classification of scripted activity in computer systems.

BACKGROUND

Cybercrime is criminal activity involving computer systems. For example, a computer system may be used to perpetrate a crime or may be a target of criminal activity. Such criminal activity may include unauthorized access to personal information, credit card accounts, bank accounts, and other secure data. In addition, cybercrime also may include the propagation of computer viruses and fraud using computer systems.

A "script" generally refers to a collection of executable computer language instructions stored in a file. Scripts usually are created to automate execution of the instructions by a computer system. Automated scripts are executed much faster and in greater number than what can be accomplished using human effort. As a result, criminals routinely use automated scripts in cybercrime to minimize effort, to increase overall numbers of targets and victims, and to carry out sophisticated attacks through bypassing known security measures.

Accordingly, improved methods of detecting and classifying automated scripts can aid in the identification, prevention and mitigation of cyberattacks.

BRIEF DESCRIPTION OF THE DRAWINGS

Various examples of the present disclosure will be understood more fully from the detailed description given below and from the accompanying drawings of various examples of the disclosure. In the drawings, like reference numbers may indicate identical or functionally similar elements. The drawing in which an element first appears is generally indicated by the left-most digit in the corresponding reference number.

DETAILED DESCRIPTION

Systems, methods, and computer program products for detecting and classifying scripted computer system activity are disclosed. Examples of the present disclosure identify applications interacting with a computer system as operated by an automated script, by a human, or a by combination of an automated script and human interaction.

In an example, an application running on a client device interacts with a web server providing access to a web-based application. The web server receives a request from the client application (e.g., web browser, computer program, computer script, etc.) and a script detection system issues one or more challenges, either in response or as part of a response, to test the client application. For example, challenges may test capabilities of the client application to determine an application type of the client application. In one example, challenges test whether the client application is a web browser or another type of computer program imitating a web browser, regardless of how the client application has identified or represented itself.

In an example, the script detection system analyzes results of challenges issued to the client application to associate the application with an application type, analyzes fingerprint information collected about the client application, and analyzes monitored activity performed by the client application. The script detection system also computes a reputation score based on one or more of these factors, which indicates trustworthiness of the client application.

In an example, the script detection system determines whether activity of the client application is scripted or manually performed based on one or more of challenge results, information collected about the application, activity performed by the application, or the reputation score of the application. The script detection system also may classify scripted activity as automated or semi-automated based on one or more of these factors. Further, one or more actions may be triggered in response to the detection and classification of scripted activity based on a security level associated with a computer system.

Accordingly, aspects of the present disclosure allow detection of scripted activity and classification of such activity as automated, semi-automated, or manual. Such detection and classification may be used to prevent and mitigate unauthorized computer system activity.

Figure 1:
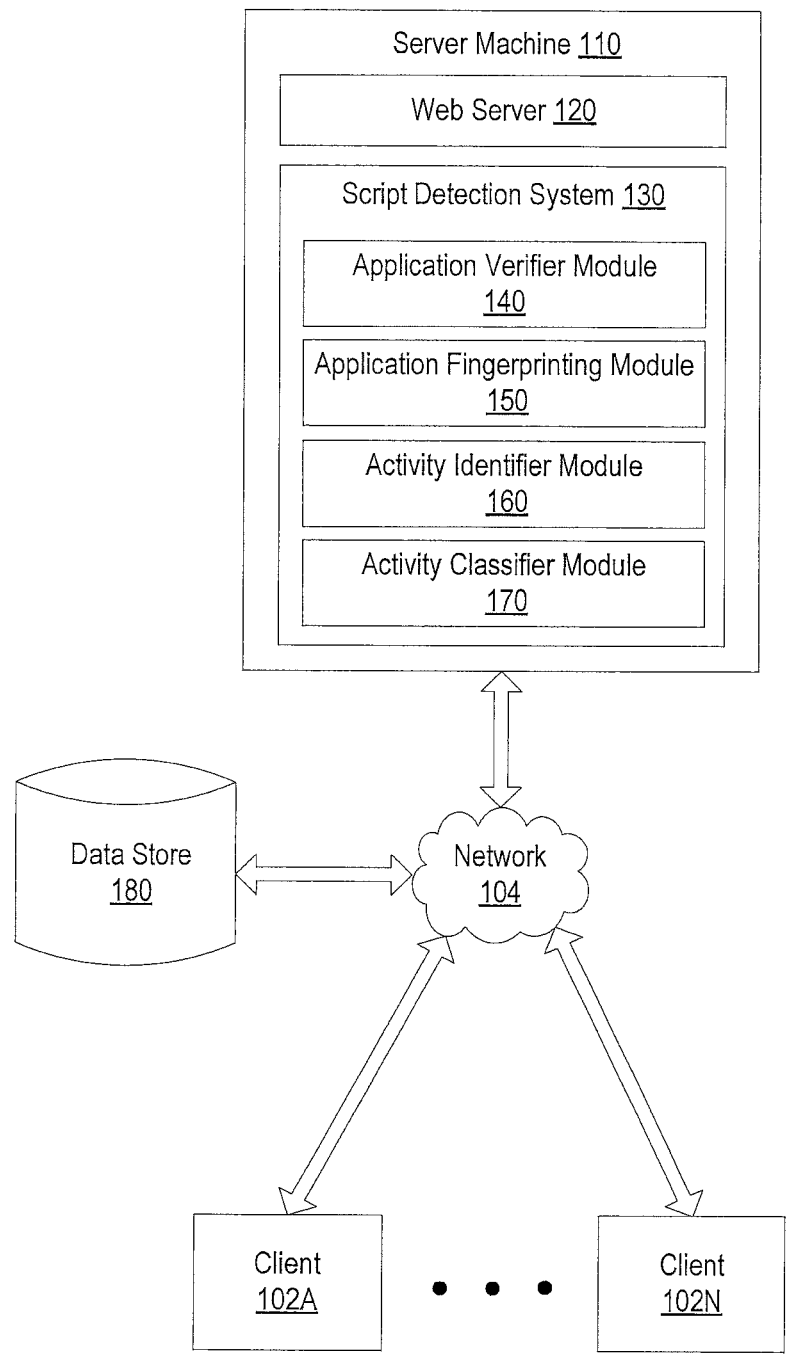
FIG. 1 is a block diagram illustrating a system architecture, in accordance with various examples of the present disclosure.

FIG. 1 illustrates an exemplary system architecture 100 in which examples of the present disclosure can be implemented. System architecture 100 includes server machine 110, a data store 180 and client machines 102A-102N connected to a network 104. Network 104 may be a public network (e.g., the Internet), a private network (e.g., a local area network (LAN) or wide area network (WAN)), or a combination thereof. In an example, network 104 may include the Internet and/or one or more intranets, landline networks, wireless networks, and/or other appropriate types of communication networks. In one example, the network 104 may comprise a wireless telecommunications network (e.g., cellular phone network) adapted to communicate with other communication networks, such as the Internet.

Data store 180 is persistent storage that is capable of storing various types of data, such as text, audio, video and image content. In some examples data store 180 might be a network-attached file server, while in other examples data store 180 might be some other type of persistent storage such as an object-oriented database, a relational database, and so forth.

Client machines 102A-102N may be personal computers (PC), laptops, mobile phones, tablet computers, or any other computing device. Client machines 102A-102N may run an operating system (OS) that manages hardware and software of the client machines 102A-102N. A browser (not shown) may run on the client machines (e.g., on the OS of the client machines). The browser may be a web browser that can access content and services provided by a web server 120 of server machine 110. Other types of computer programs and computer scripts also may run on client machines 102A-102N.

Server machine 110 may be a rackmount server, a router computer, a personal computer, a portable digital assistant, a mobile phone, a laptop computer, a tablet computer, a camera, a video camera, a netbook, a desktop computer, a media center, or any combination thereof. Server machine 110 may include a web server 120 and a script detection system 130. In some examples, web server 120 and script detection system 130 may run on one or more different machines.

Web server 120 may serve text, audio, video and image content from data store 180 to clients 102A-102N. Web server 120 also may provide web-based application services and business logic to clients 102A-102N. Clients 102A-102N may locate, access and consume various forms of content and services from web server 120 using applications, such as a web browser. Web server 120 also may receive text, audio, video and image content from clients 102A-102N that is saved in data store 180 for purposes that may include preservation and distribution of content.

In an example, web server 120 is coupled to one or more applications servers (not shown) that provide applications and services to clients 102A-102N, for example, through web server 120. For example, web server 120 may provide clients 102A-102N with access to one or more applications, which include but are not limited to banking, electronic commerce, e-mail, social networking, etc. Such functionality also may be provided, for example, as one or more different web applications, standalone applications, systems, plugins, web browser extensions, and application programming interfaces (APIs).

In an example, some clients 102A-102N may include applications associated with a service provided by server 110. In one example, one or more device types (e.g., smart phones, smart televisions, tablet computers, etc.) may use applications to access content provided by server 110, to issue commands to server 110, to receive content from server 110 without visiting or using web pages.

In an example, functions performed by server 110 and/or web server 120 also may be performed by the client machines 102A-102N, in whole or in part. In addition, the functionality attributed to a particular component may be performed by different or multiple components operating together. Server 110 also may be accessed as a service provided to other systems or devices appropriate application programming interfaces, and thus is not limited to use in websites.

In an example, script detection system 130 includes application verifier module 140, application fingerprinting module 150, activity analyzer module 160, and activity classifier module 170. In other examples, functionality associated with application verifier module 140, application fingerprinting module 150, activity analyzer module 160, and activity classifier module 170 may be combined, divided and organized in various arrangements.

In an example, application verifier module 140 receives one or more user requests from an application running on a client 102A. In response, application verifier module 140 issues a challenge to the application to determine whether or not an application is a particular application type. For example, application verifier module 140 may challenge the application to perform one or more tasks or to answer one or more questions (e.g., in a process of elimination). Application verifier module 140 then may analyze one or more results of the challenges to determine whether or not the application is a web browser, an automated script, a shell browser automated by a script, or another type of application. Thus, application verifier module 140 may determine an application type of an application based on whether the application is able or unable to perform certain tasks or answer certain questions in a manner consistent with an application type.

In an example, application verifier module 140 adaptively selects a challenge to present to the application from a collection of one or more available challenges. In one example, application verifier module 140 selects challenges randomly. Application verifier module 140 also may select challenges adaptively or by using a process of elimination to determine whether an application is associated with a particular application type.

In an example, application verifier module 140 issues one or more challenges to an application at a particular time or at various times as a client 102A application interacts with server machine 110. For example, application verifier module 140 may issue one or more challenges as part of authentication and authorization of a user login. In one example, application verifier module 140 issues challenges to an application at various points throughout a session. For example, application verifier module 140 may issue a challenge to a client 102A application at random times or when the application seeks to perform one or more predetermined activities during a session.

In an example, application fingerprinting module 150 receives information about the application. For example, application fingerprinting module 150 may actively collect information from the application or may receive such information from another source that has gathered or receive the data.

In an example, application fingerprinting module 150 receives information associated with a client 102A application from one or more sources. For example, information associated with an application may be collected from cookies, supercookies, user agents, browser fingerprints, flash shared objects, network devices, etc. Such sources may provide correct or altered information about what an application is, what an application can do, a computing device executing the application, an environment where the application that executes, a location of the computing device where the application executes, etc. In one example, application fingerprinting module 150 analyzes information associated with a client 102A application from various sources to detect consistency and inconsistency as part of identifying and classifying scripted activity.

In an example, activity analyzer module 160 monitors and analyzes activity performed by a client 102a application that interacts with a server machine 110, web server 120, or other computing system. In one example, activity analyzer module 160 analyzes timing of application requests to determine the likelihood of whether the activity is associated with an automated script. For example, activity analyzer module 160 may compare timing of application requests to baseline timing of human responses to determine whether the application requests are associated with scripted activity.

In an example, activity analyzer module 160 monitors and analyzes web pages and other objects accessed by a client 102A application, navigation of a client 102A application through a web site or other type of target application, repetition in the behavior of a client 102A application, whether a client 102A application accesses multiple accounts, and other various aspects of interaction between a client 102A application and a target computer system.

In an example, activity classifier module 170 calculates a reputation score or rating for a client 102A application interacting with a server machine 110 or a web server 120. A reputation score or rating generally refers to a score, classification or ranking, which indicates trustworthiness of an application. In one example, activity classifier module 170 computes a reputation score for a client 102A application based on information provided by one or more of application verifier module 140, application fingerprinting module 150, and activity analyzer module 160. For example, a reputation score may be based in part on comparing are what a client 102A application says it is to what script detection system 130 determines the client 102A application to be.

In an example, a client 102A application may indicate that it is a web browser via a user agent. However, challenges that issued to the client 102A application may reveal that the application behaves like a PERL® script. Therefore, such a discrepancy generally may reduce the reputation score or rating of the application. Further, activity performed by a client 102A application at a much faster rate than human initiated activity also may lower the reputation score rating of the application. In contrast, the reputation score for a client 102A application may increase, for example, incrementally when the application behaves in a manner matching an application type expected to be interacting with a computer system (e.g., a web browser), when the application behaves in a manner consistent with how it has identified itself, or when the application appears to be operated by human rather than by an automated script.

In an example, activity classifier module 170 determines whether activity performed by a client 102A application is scripted and classifies the activity as automated, semi-automated, or manually performed. In one example, activity classifier module 170 determines that client 102A application activity is scripted based on any single determination or finding provided by application verifier module 140, application fingerprinting module 150, or application analyzer module 160. Activity classifier module 170 also may use the same information or other information to classify the activity as one of automated, semi-automated or manually performed.

In an example, activity classifier module 170 also may determine that client 102A application activity is scripted based on a combination of information or determinations provided by any two or more of the application verifier module 140, application fingerprinting module 150, and activity analyzer module 160. Activity classifier module 170 also may use the same information or other information to classify the activity as one of automated, semi-automated or manually performed.

In an example, activity classifier module 170 determines that a client 102A application is associated with scripted activity when a reputation score for the application does not meet a predetermined threshold of trustworthiness. In one example, activity classifier module 170 classifies client 102A application activity determined to be scripted as automated or semi-automated based on a computed reputation score for the application or information provided by any of application verifier module 140, application fingerprinting module 150, and activity analyzer module 160.

Figure 2:
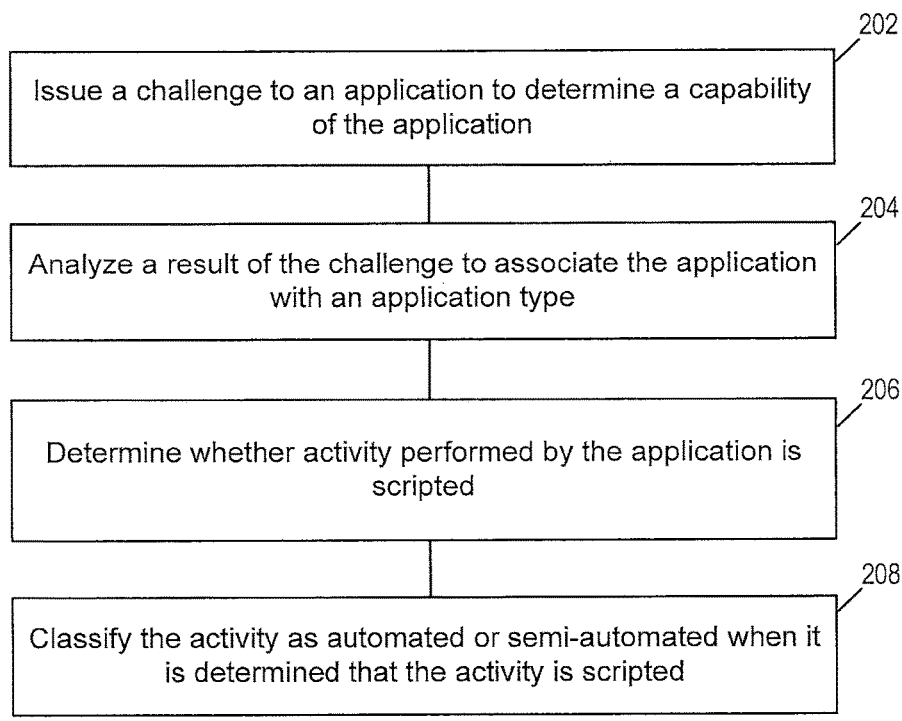
FIG. 2 is a flow diagram illustrating detection of scripted activity, according to an example of the present disclosure.

FIG. 2 is a flow diagram illustrating detection of scripted activity, according to an example of the present disclosure. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 200 begins at block 202 when script detection system 130 issues a challenge to a client 102A application to determine a capability of the application. In one example, application verifier module 140 selects a challenge to issue to a client 102A application interacting with server machine 110 from one or more available challenges or different collections of challenges designed to test capabilities of various application types. For example, application verifier module 140 may use challenges that are each configured to test capabilities of application types, such as web browsers, Java® applications, PERL® scripts, etc.

In an example, a web browser is an accepted or approved application type expected to interact with a web application provided by web server 120. Application verifier module 140 selects one or more challenges that it will issue to a client 102A application making requests to web server 120. For example, application verifier module 140 may seek to determine whether a client 102A application interacting with web server 120 is a web browser, a particular type of web browser, or another application type.

In an example, application verifier module 140 issues a challenge written in the JavaScript® programming language to a client 102A application that it expects to be a web browser. For example, JavaScript® code may be sent to a client 102A application as part of a response to a request. In one example, web browser challenges may include asking a web browser to provide a list of installed plug-ins, to provide a list of available fonts, to perform a mathematical calculation, or to obtain a resource (e.g., a file) from a particular location. In one example, application verifier module 140 may select and issue a series of challenges randomly and/or adaptively to prove or disprove that an application is associated with an approved or non-approved application type.

In an example, each challenge may be blocking or non-blocking to client 102A application interaction with a server machine 110, web server 120, application server, software application, etc. For example, a blocking challenge may require a client 102A application to first provide a response to an issued challenge before the application is permitted to continue interacting with a computer system. In an example, a non-blocking challenge allows a client 102A application to continue interacting with a computer system even when the application does not provide a response to the challenge. In one example, a reputation score of a client 102A application is reduced or lowered when the application does not provide a response to an issued challenge.

In an example, a non-blocking challenge allows a client 102A application to continue interacting with a computer system for a limited period. For example, a client 102A application may be permitted to continue interacting with a computer system for a limited period of time or for a limited number of requests before a response to an issued challenge is required. In one example, a client 102A application session is disallowed or terminated when the application fails to respond to one or more challenges.

At block 204, the script detection system 130 analyzes a result of the challenge to associate a client 102A application with an application type. In an example, application verifier module 140 analyzes a result returned from a client 102A application in response to an issued challenge. In one example, application verifier module 140 compares a result of the challenge to an expected result for an application type tested by the challenge. For example, application verifier module 140 may issue a challenge designed to test whether a client 102A application is a web browser. A web browser specific challenge may inquire about a specific web browser details that are not available in other application types. Thus, application types other than web browsers generally would not have the capability to answer web browser specific challenges.

In an example, application verifier module 140 associates a client 102A application with an application type based on its analysis of one or more challenge results. In one example, application verifier module 140 determines a probability that an application is associated with an application type based on results of one or more challenges. For example, application verifier module 140 may determine a probability that a client 102A application is associated with one or more different application types based on each challenge response provided by a client 102A application. Application verifier module 140 then may conclude that the application is associated with one or more application types, for example, after a certain number of challenges have been issued, based on a numeric threshold, or when a statistical level of certainty has been met.

At block 206, script detection system 130 determines whether activity performed by a client 102A application is scripted. In an example, script detection system 130 determines that activity performed by a client 102A application is scripted when the application is unable to correctly answer or perform one or more challenges or a certain number or percentage of challenges. In one example, script detection system 130 also may determine that activity performed by a client 102A application is scripted when the application correctly answers or performs one or more challenges associated with a non-approved application type for interacting with server machine 110 or web server 120.

In an example, script detection system 130 determines that activity performed by a client 102A application is scripted based on analyzing the activity. In one example, activity analyzer module 150 analyzes a speed at which the activity is performed, objects and functionality that are accessed, navigation performed by the application activity, repetition in behavior of the application activity, patterns in application activity network traffic, patterns in application activity data, etc.

In an example, activity classifier module 170 determines that activity performed by a client 102A application is scripted when it detects that the activity is performed at a faster rate than human initiated activity associated with a similar computing device, when the activity accesses certain objects or functionality, when it detects the activity is performing anomalous website navigation, when it detects a repetitive pattern in the activity, or when it detects anomalous network traffic patterns or alphanumeric character strings associated with scripted activity.

In one example, activity classifier module 170 determines that activity performed by a client 102A application is scripted when information collected about the application by application fingerprinting module 150 is inconsistent with information determined about the application by application verifier module 140 based on results of one of more challenges. For example, information about the application may be collected from cookies, supercookies, user agents, browser fingerprints, flash shared objects, network devices, etc. In one example, a client 102A application is determined to be scripted when an application type found and information collected about the application does not match an application type that has been determined for a client 102A.

At block 208, script detection system 130 classifies the activity as automated or semi-automated when it is determined that the activity is scripted. In an example, activity classifier module 170 classifies the activity of a client 102A application determined to be scripted as automated or semi-automated activity. In one example, automated activity generally refers to application activity that is determined to be performed by a computer system. Semi-automated activity generally refers to application activity that is determined to be performed by a combination of a computer system and human effort.

In an example, activity classifier module 170 classifies activity of a client 102A application as automated. For example, activity classifier module 170 may classify a client 102A application as automated when detecting that an application type determined to be associated with the application is an unapproved application type (i.e., not expected to interact with server machine 110 or web server 120). In one example, a web browser application may be an approved application type expected to interact with web server 120. However, an application determined to be another application type (a Java® application, PERL® script, etc.) may be unapproved for interaction with web server 120.

In an example, activity classifier module 170 also may classify an application as automated when information collected about a client 102A application is inconsistent with an application type determined to be associated with the application. For example, an application may identify itself as a web browser, but the application actually may be determined to be a different application type based on a result of one or more challenges. In one example, activity classifier module 170 also may classify an application as automated even when information collected about a client 102A application is consistent with a determined application type. For example, activity classifier module 170 may classify application activity as automated based on analysis of client 102A application activity or a corresponding determination provided by activity analyzer module 160.

In an example, activity classifier module 170 classifies activity of a client 102A application determined to be scripted as semi-automated. In one example, activity classifier module 170 classifies application activity as semi-automated when analysis of the activity or a corresponding determination provided by activity analyzer module 160 indicates that the activity is performed by some combination of computer system and human effort. For example, a pattern or timing of activity performed by an application during a login process on server machine 110 or web server 120 may indicate that the activity is human driven. However, a later pattern or timing of activity performed during an authenticated session resulting from the login process may indicate that another portion of the activity is performed by a computer system (e.g., via execution of automated scripts).

In an example, one or more actions are taken when scripted activity is detected and/or classified as automated or semi-automated. In one example, responsive actions are performed based a level of sensitivity or confidentiality associated with an application or associated information. Thus, actions taken in response to detecting automated or semi-automated scripts may be tailored flexibly to any organization, application, situation, etc.

In an example, detection and classification of scripted activity triggers generation of a corresponding logged event with associated information. An alert also may be generated and transmitted to notify one or more parties of the event. In one example, a security permission of a session involving the application determined to be performing scripted activity is adjusted. For example, security permissions for a user may be modified from writeable to read-only to prevent data modification. User access also may be restricted to a limited set of objects or functionality. In some examples, sessions are terminated, user accounts are disabled and access is blocked to a source of a client 102A application.

Figure 3:
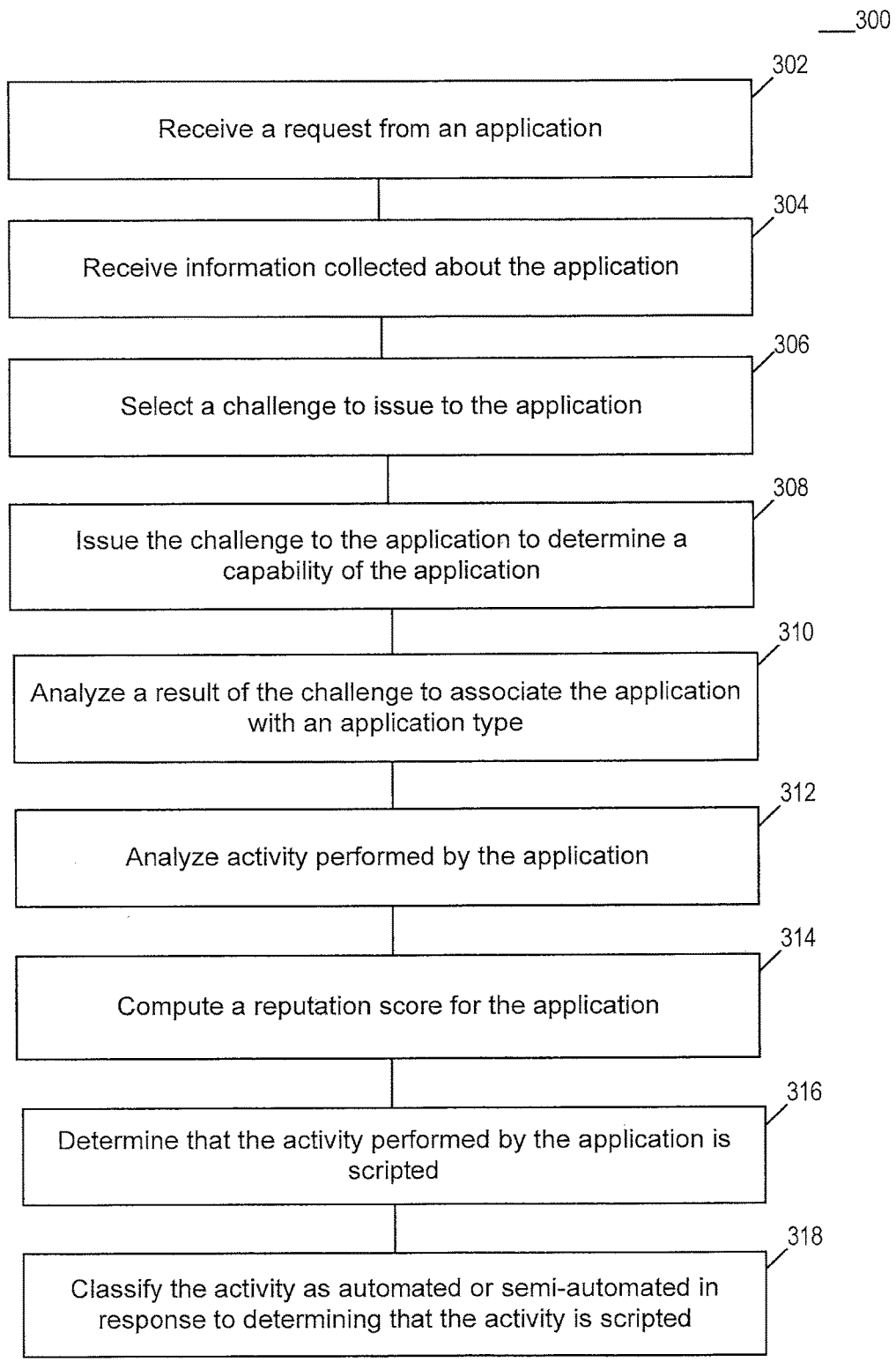
FIG. 3 is a flow diagram illustrating multifactor detection of scripted activity, according to an example of the present disclosure.

FIG. 3 is a flow diagram illustrating multifactor detection of scripted activity, according to an example of the present disclosure. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof.

Method 300 begins at block 302 when script detection system 130 receives a request from a client 102A application. In an example, an application running on a client 102A interacts with server machine 110 by sending a request to web server 120. For example, an application running on 102A may access a landing page, login page, or transactional page of a web application provided by web server 120. The web application may provide services, such as banking, electronic commerce, e-mail, social networking, e-mail, etc.

At block 304, script detection system 130 receives collected information about the client 102A application. In an example, application fingerprinting module 150 collects or receives collected information about a client 102A application that interacts with server machine 110 or web server 120. In one example, application fingerprinting module 150 collects or receives information from one or more of cookies, supercookies, user agents, flash shared objects, network diagnostics, etc. The collected information, for example, may indicate attributes of the application, aspects of an environment where the application executes, attributes of a computing device that executes the application, attributes of one of more network connections used by the application, etc.

At block 306, script detection system 130 selects a challenge to issue to the client 102A application. In an example, application verifier module 140 selects a challenge to issue to a client 102A application based on an approved or expected application type that is to interact with server machine 110 or web server 120. Application verifier module also may select a challenge to issue to the application based on information collected about the application received at block 304.

At block 308, script detection system 130 issues a challenge to the client 102A application to determine one or more capabilities of the application. In an example, application verifier module 140 issues the challenge selected at block 306 to the application to determine whether the application has the capability to perform the challenge or to provide information requested by the challenge.

In an example, application verifier module 140 issues a challenge by sending JavaScript® code to a client 102A application expected to be a web browser as part of a response to a request received from the application. In one example, application verifier module 140 issues the challenge to determine whether the application is a web browser by asking the application to perform an activity or to provide information that is inherent to a web browser. For example, a standard web browser usually can provide a list of installed plug-ins, provide a list of available fonts, perform a mathematical calculation, and obtain a resource (e.g., a file) from a particular location. Application verifier module 140 may select and issue a series of random or adaptive challenges to prove or disprove that an application is associated with an application type.

At block 310, script detection system 130 analyzes a result of the challenge to associate the client 102A application with an application type. In an example, application verifier module 140 compares a response to a challenge received from a client 102A application to an expected result associated with an application type. For example, application verifier module 140 may analyze whether a result partially or fully matches expected result associated with an approved application type or an unapproved application type to determine whether the application is or is not associated with an application type.

In an example, application verifier module 140 may issue a series of challenges to a client 102A application, for example, randomly or adaptively. In one example, application verifier module 140 determines a probability that the application is associated with each of one or more application types. For example, application verifier module 140 may compute and re-compute a probability that the application is associated with each of multiple application types based on results provided by a client 102A application in response to multiple challenges.

At block 312, script detection system 130 analyzes activity performed by a client 102A application. In an example, activity analyzer module 160 monitors activity of a client 102A application interacting with web server 120 of server machine 110. In one example, activity analyzer module 160 may analyze timing of requests to determine whether the activity is initiated by an automated or semi-automated script. For example, activity analyzer module 160 may compare timing of client 102A application activity to timing of similar activity as performed by a human to determine whether the application requests are associated with the scripted activity. In one example, activity analyzer module 160 analyzes website navigation performed by the activity, repetition in the behavior of the activity, whether the activity accesses or attempts to access multiple accounts, etc.

At block 314 script detection system 130 computes a reputation score for the client 102A application. In an example, activity classifier module 170 computes a reputation score or rating indicating trustworthiness of a client 102A application interacting with web server 120 of server machine 110. In one example, activity classifier module 170 computes a reputation score for an application based on a correlation between an application type that is determined to be associated with the application and information collected about the application. For example, the more closely a client 102a application behaves to how it identifies itself may result in a higher reputation score.

In an example, a reputation score for a client application also may be influenced positively or negatively based on behavior of the application. For example, application activity associated with anomalous timing or behavioral patterns may result in a reduction in reputation score where non-suspicious activity may result in a consistent or improved reputation score. In one example, a reputation score may be initially computed and updated any number of times as new information is observed or learned about a client 102A application.

At block 316, script detection system 130 determines that the activity performed by the client 102A application is scripted. In an example, application verifier module 140 determines that activity performed by a client 102A application is scripted when a client 102A application is unable to correctly respond to a challenge associated with an approved application type for interacting with server machine 110 or web server 120. In one example, application fingerprinting module 150 determines that activity performed by a client 102A application is scripted based on information collected about the application. In one example, activity analyzer module 160 determines that activity performed by a client 102A application is scripted based on a pattern of anomalous timing or behavior that it detects when analyzing the activity.

In an example, activity classifier module 170 determines that application activity is scripted based on a reputation score computed for the application. In one example, activity classifier module 170 determines that a client 102A application interacting with web server 120 is scripted when a reputation score computed for the application does not meet a predetermined threshold indicating that the application is trustworthy. In one example, classifier module 170 compares a reputation score computed for an application to a predetermined threshold of trustworthiness each time the reputation score is updated based on new information.

At block 318, script detection system 130 classifies the activity as automated or semi-automated in response to determining that the activity is scripted. In an example, activity classifier module 170 classifies activity of a client 102A application as automated or semi-automated activity. For example, activity classifier module 170 may classify an application as automated by determining that an application type of an application is an unapproved application type for interacting with web server 120. Activity classifier module 170 also may classify an application as automated when information collected about a client 102A application is inconsistent with an application type determined to be associated with the application. Activity classifier module 170 also may classify application activity as automated based on analysis of the activity or a corresponding determination provided by activity analyzer module 160.

In an example, activity classifier module 170 classifies activity of a client 102A application as semi-automated. In one example, activity classifier module 170 classifies activity as semi-automated when it is determined that the activity is performed by a combination of computer system and human effort. For example, application activity may be associated with human interaction at one point in a session and then may be associated automated execution by a computer system at another point in the session (or vice versa). In one example, activity classifier module 170 may classify activity as semi-automated based on a reputation score computed for the application.

In an example, one or more actions are taken when scripted activity is detected or identified as automated or semi-automated. In one example, responsive actions are performed based a level of sensitivity or confidentiality associated with an application or associated information. Thus, actions taken in response to detecting automated or semi-automated scripts may be tailored flexibly to any organization, application, situation, etc.

In an example, one or more activities are performed in response to classifying application activity as automated or semi-automated. For example, an event may be logged, an alert may be transmitted, a security permission of a session or user may be modified, a session may be terminated, a user account may be disabled, access may be blocked for a client 102A application or for a source of the application, etc.

Figure 4:
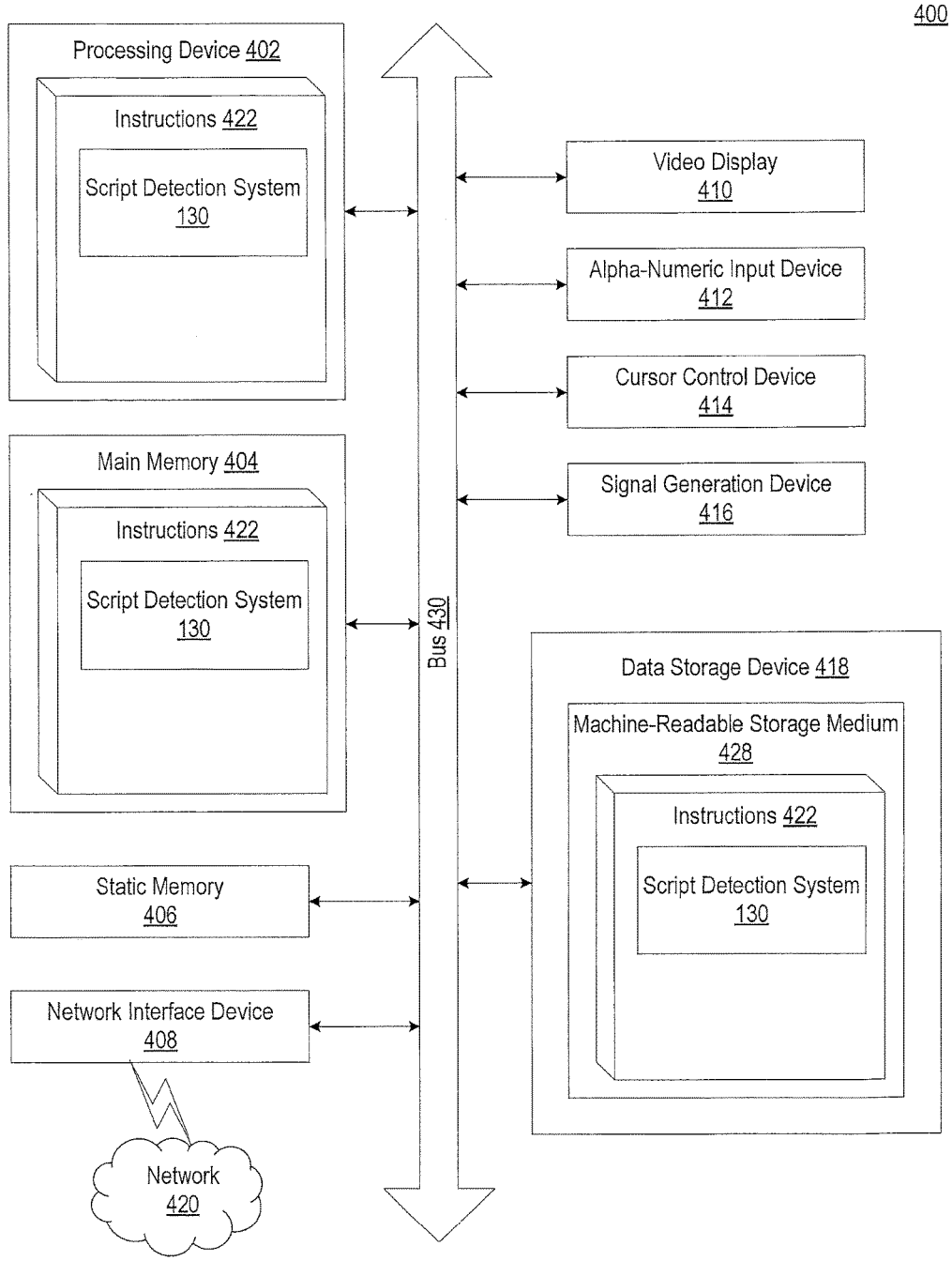
FIG. 4 is a block diagram of an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In other examples, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one example, the instructions 422 include instructions for a script detection system (e.g., script detection system 130 of FIG. 1) and/or a software library containing methods that call a script detection system. While the computer-readable storage medium 428 (machine-readable storage medium) is shown in an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A computer system, comprising:
   a non-transitory memory storing instructions; and
   one or more hardware processors coupled to the non-transitory memory and configured to read the instructions from the non-transitory memory and to execute the instructions to cause the computer system to perform operations comprising:
   receiving user agent data from an application interacting with the computer system, the user agent data associating the application with a type of web browser application;
   categorizing the application as a web browser application based on analyzing the user agent data;
   issuing a web browser challenge to the application, the web browser challenge being selected based on the user agent data and testing web browser application behavior;
   receiving a response to the web browser challenge from the application;
   generating a reputation score for the application based on analyzing activity performed by the application, a determined correctness of the response to the web browser challenge, and the user agent data;
   determining that at least some of the activity performed by the application is scripted instead of being performed by a human based on analyzing the response to the web browser challenge and based on the generated reputation score;
   adjusting the categorizing of the application to identify the application as scripted based on the determining that at least some of the activity performed by the application is scripted; and
   classifying the application as one of an automated script or a semi-automated script based on the generated reputation score for the application, analyzing the activity performed by the application, and one or more web browser plug-ins associated with the application.

2. The computer system of claim 1, wherein the operations further comprise:
   selecting the web browser challenge from a plurality of available web browser challenges.

3. The computer system of claim 2, wherein the web browser challenge is selected adaptively from the plurality of available web browser challenges.

4. The computer system of claim 1, wherein the operations further comprise:
   comparing the result of the web browser challenge to an expected result for a web browser application.

5. The computer system of claim 1, wherein the operations further comprise:
   determining a probability that the application is a web browser application based on the user agent data and the generated reputation score.

6. The computer system of claim 1, wherein the classifying of the application as one of an automated script or a semi-automated script is further based on a second response received from the application in association with a second web browser challenge issued to the application.

7. The computer system of claim 1, wherein the classifying of the application as one of an automated script or a semi-automated script is further based on a detected pattern of behavior associated with the activity performed by the application.

8. The computer system of claim 1, wherein the classifying of the application as one of an automated script or a semi-automated script is further based on the user agent data.

9. The computer system of claim 1, wherein the operations further comprise:
   comparing the activity performed by the application to a predetermined pattern of activity associated with a scripted application.

10. The computer system of claim 1, wherein the web browser challenge is provided to the application in a computer scripting language.

11. The computer system of claim 1, wherein the determining that the application is scripted further is based on comparing the generated reputation score to a predetermined threshold.

12. The computer system of claim 1, wherein the operations further comprise:
adjusting a security permission associated with the application in response to determining that the application is scripted.

13. The computer system of claim 1, wherein the operations further comprise:
terminating a session involving the application in response to determining that the application is scripted.

14. The computer system of claim 1, wherein the operations further comprise:
transmitting an alert in response to determining that the application is scripted.

15. The computer system of claim 1, wherein the operations further comprise:
disabling a user account associated with a session involving the application in response to determining that the application is scripted.

16. A computer-implemented method, comprising:
receiving, by a processor device, user agent data from an application, the user agent data associating the application with a type of web browser application;
issuing, by the processor device, a web browser challenge to the application, the web browser challenge being generated based on the user agent data;
analyzing, by the processor device, a response to the web browser challenge received from the application;
generating, by the processor device, a reputation score for the application based on analyzing activity performed by the application, determining correctness of the response to the web browser challenge, and the user agent data;
determining, by the processor device, that at least some of the activity performed by the application is scripted instead of being performed by a human based on the analyzing of the response to the web browser challenge and based on the reputation score generated for the application;
categorizing, by the processor device, the application as scripted based on the determining that at least some of the activity performed by the application is scripted; and
classifying, by the processor device, the application as one of an automated script or a semi-automated script, based on the reputation score generated for the application, analyzing the activity performed by the application, and one or more web browser plug-ins associated with the application.

17. The computer-implemented method of claim 16, further comprising:
disallowing, by the processor device, a subsequent session being initiated by the application based on previously determining that the application is scripted.

18. A non-transitory machine-readable medium having stored thereon machine-readable instructions executable to cause a machine to perform operations comprising:
receiving user agent data from an application, the user agent data associating the application with a type of web browser;
categorizing the application as a web browser application based on analyzing the user agent data;
issuing a web browser challenge to the application, the web browser challenge being generated based on the user agent data;
receiving a response to the web browser challenge from the application;
generating a reputation score for the application based on analyzing activity performed by the application, determining correctness of the response to the web browser challenge, and the user agent data;
determining that at least some of the activity performed by the application is scripted instead of being performed by a human based on analyzing the response to the web browser challenge, and based on the reputation score generated for the application;
adjusting the categorizing of the application to identify the application as scripted based on the determining that at least some of the activity performed by the application is scripted; and
classifying the application as one of an automated script or a semi-automated script based on the reputation score generated for the application, analyzing the activity performed by the application, and one or more web browser plug-ins associated with the application.

19. The non-transitory computer-readable medium of claim 18, wherein the operations further comprise:
terminating a session involving the application in response to determining that the application is scripted.

* * * * *